Jan. 12, 1926.

J. H. FOX 1,569,082

APRON FOR PLATE GLASS MACHINES

Filed Jan. 22, 1924

4 Sheets-Sheet 1

INVENTOR
John H. Fox
by
James C. Bradley
Atty.

Jan. 12, 1926. 1,569,082
J. H. FOX
APRON FOR PLATE GLASS MACHINES
Filed Jan. 22, 1924    4 Sheets-Sheet 2
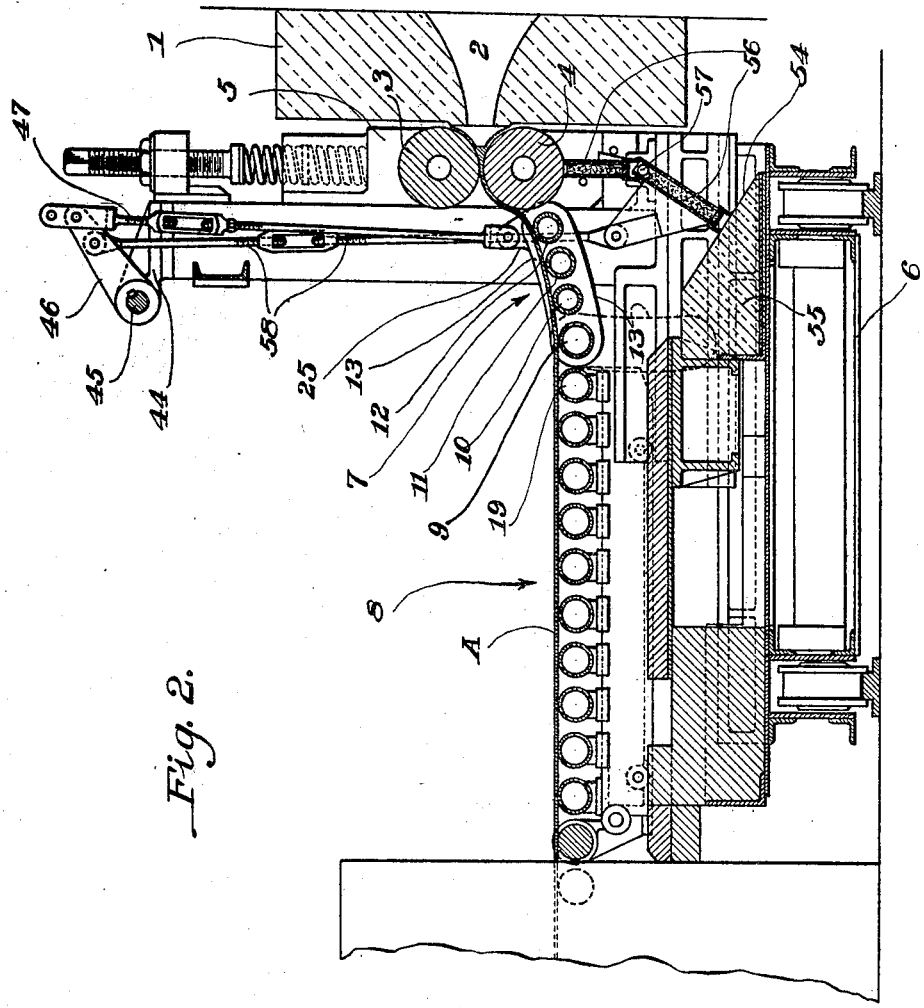
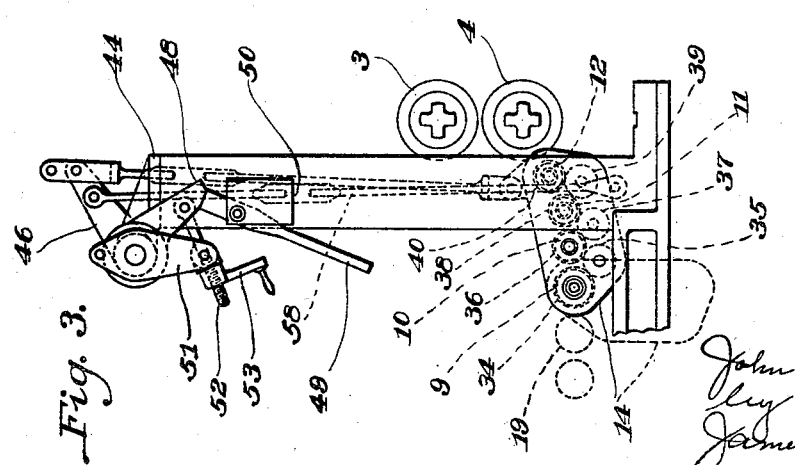

Jan. 12, 1926.                                                    1,569,082
                              J. H. FOX
                    APRON FOR PLATE GLASS MACHINES
                         Filed Jan. 22, 1924         4 Sheets-Sheet 3
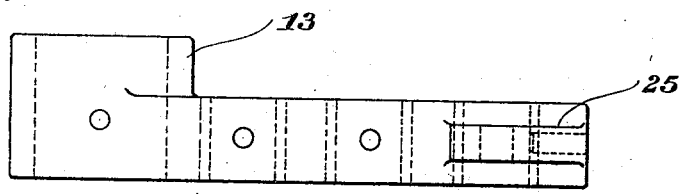
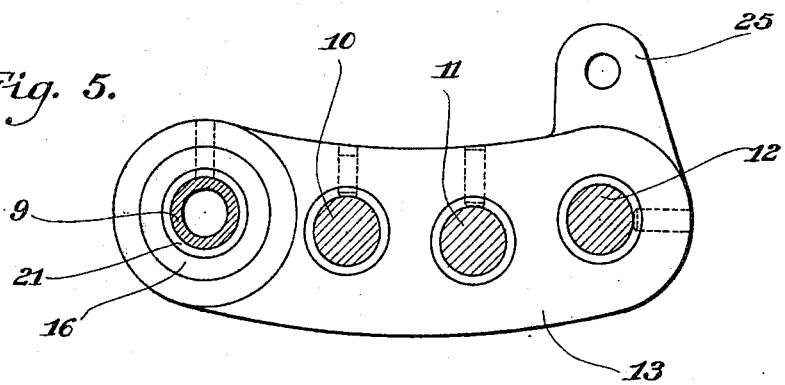
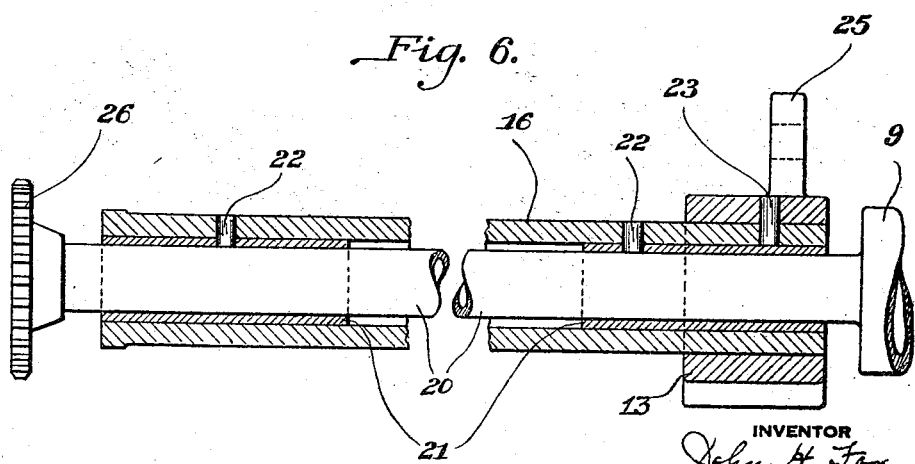

Jan. 12, 1926.　　　　　　　　　　　　　　　　　　　　1,569,082
J. H. FOX
APRON FOR PLATE GLASS MACHINES
Filed Jan. 22, 1924　　　　4 Sheets-Sheet 4

INVENTOR
John H. Fox
James C. Bradley
Atty

Patented Jan. 12, 1926.

1,569,082

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

APRON FOR PLATE-GLASS MACHINES.

Application filed January 22, 1924. Serial No. 687,704.

*To all whom it may concern:*

Be it known that I, JOHN H. Fox, a citizen of the United States, and a resident of Pittsburgh, in the county of Allegheny and State of Pennsylvania, have made a new and useful invention in Improvements in an Apron for Plate-Glass Machines, of which the following is a specification.

Figure 1:
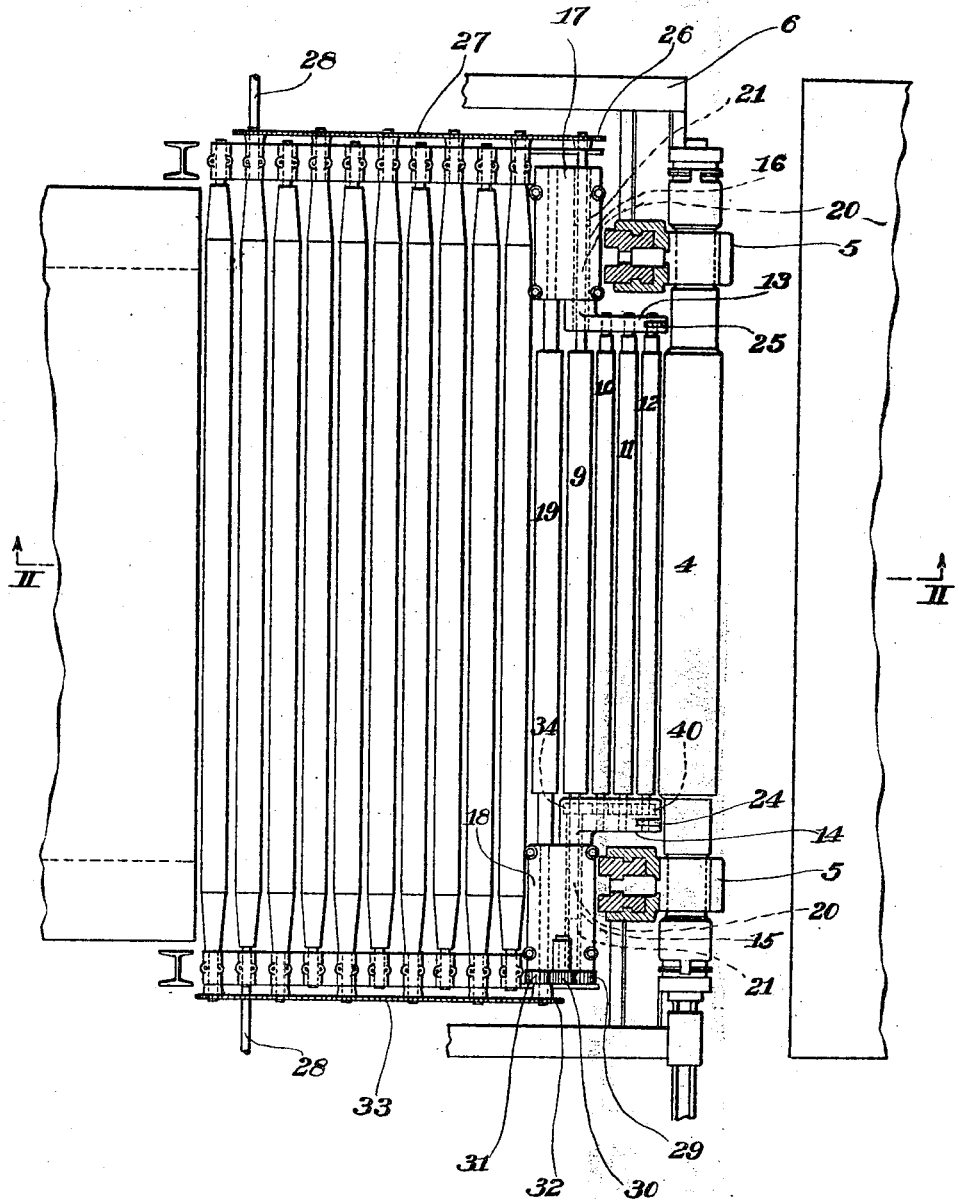
Figure 7:
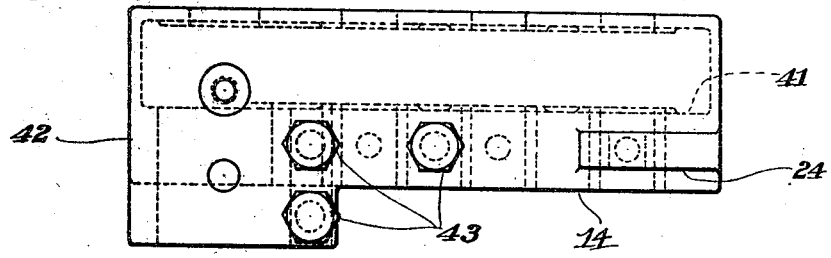
Figure 8:
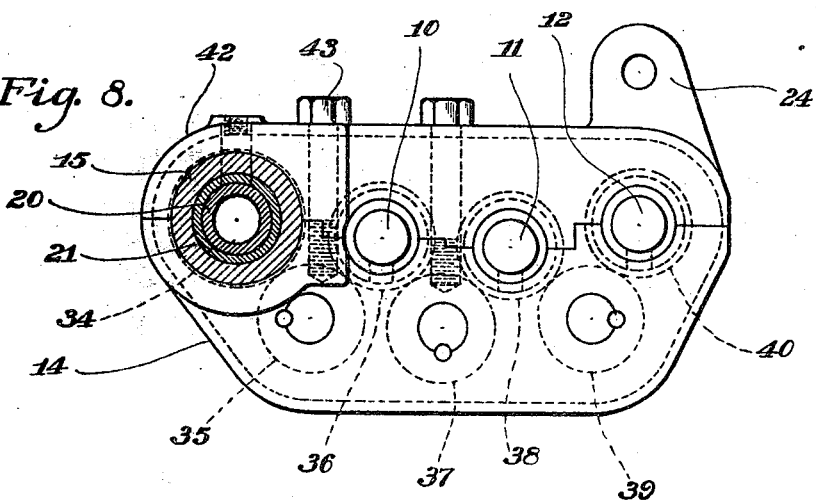
Figure 9:
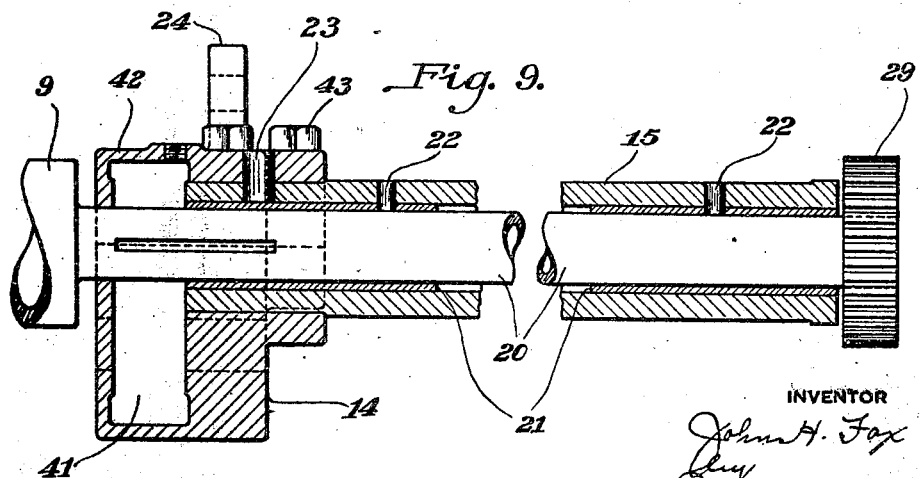

The invention relates to apparatus for making plate glass continuously from a melting tank, and particularly to the apron and table which receive the sheet or ribbon after it is first formed. The invention is shown as applied to the type of apparatus disclosed in the application of Frederick Gelstharp, Serial Number 656,441, in which the glass flows by gravity from the slot through the side of a melting tank and then passes between a pair of water cooled forming rolls, and that is the type of sheet forming apparatus illustrated and described in the present application, but it will be understood that the invention, while having particular utility in connection with such sheet forming apparatus, is not limited to use therewith. The invention has for its primary objects, the provision of an improved apron construction which may be adjusted to varying angles to meet varying conditions, and which may readily swing completely out of the way in emergencies, such as that which arises when a large mass of glass is drawn through the forming rolls and would tend to overheat and injure the rolls constituting the apron or the rolls in the transfer table in advance of the apron. One embodiment of the invention is illustrated in the accompanying drawings wherein:

Figure 1 is a plan view of the apparatus. Fig. 2 is a section on the line II—II of Fig. 1. Fig. 3 is an end elevation. Figs. 4, 5 and 6 are detail views of the construction of one end of the apron. And Figs. 7, 8 and 9 are detail views of the construction at the other end of the apron.

As indicated in Figs. 1 and 2, 1 is the outlet end of a melting tank provided with the slot 2 discharging between the water cooled forming rolls 3 and 4. These rolls are supported in a suitable housing 5 carried by the truck 6. The sheet or ribbon of glass A as it passes from the forming rolls is received upon an apron 7, made up of four rolls and then passes upon a roller table 8 made up of a plurality of hollow air cooled rolls also carried by the truck. After passing over the table 8, the sheet passes into a leer, preferably of the roller type as described and illustrated in the Gelstharp application heretofore referred to. The present invention relates particularly to the apron 7 located between the forming rolls 3 and 4 and the table 8, which apron, as hereinafter more fully explained, is supported for swinging movement around the center of the roll 9 as an axis, so that the apron may be adjusted so as to lie at varying angles and so that, under emergency conditions, it may be dropped entirely out of the way in the dotted line position as indicated in Fig. 2 in order to provide a discharge opening intermediate the forming rolls and the table 8.

The apron 7 is made up of four driven rolls 9, 10, 11 and 12 mounted for rotation in a pair of end members 13 and 14, such end members being in turn supported upon a pair of trunnions 15 and 16 mounted in the bearings 17 and 18, such bearings being carried by the housing 5 in which the forming rolls are supported. These bearings 17 and 18 also carry the axle of the roll 19 which is the first roll of the table 8. Extending through the trunnions 15 and 16 are the reduced portions 20, 20 of the roll 9 which are driven, as hereinafter explained, and act as the drive means to rotate the rolls 9, 10, 11 and 12. The trunnions 15 and 16 are illustrated in section in Figs. 6 and 9. Each is provided on its interior with a pair of bushings 21 in whch the reduced portions 20 of the roll 9 turn, such bushings being secured in place by means of the dowel pins 22. The trunnion 16 has secured to it the end member 13, while the trunnion 15 has secured to it the end member 14, these members being held against rotation with respect to the trunnions by means of the dowel pins 23. These end members constitute the bearings for the ends of the rolls 10, 11 and 12, and have at their ends the lugs 24 and 25 by means of which connection is made with the means for lowering and raising the apron.

One of the reduced ends 20 of the roll 9 is provided with a sprocket wheel 26 over which passes a sprocket chain 27. This sprocket chain 27 is driven from the shaft 28 which extends transversely beneath the table 8. This shaft is provided on each end with a sprocket wheel and around this sprocket wheel extends the chain 27 which also passes over suitable sprockets on the ends of the alternate rolls constituting the table. The other reduced end 20 of the roll 9 is provided with a spur gear 29 meshing with an idler 30 which is driven from a spur gear 31 carried by the reduced end of the roll 19. This roll 19 carries at its end a sprocket 32 which is driven from a chain 33 passing around the other sprocket wheel on the shaft 28, such chain also passing around sprockets on the ends of alternate rolls of the table 8. The roll 9 is thus driven at each end and in case of accident to either of the sprocket drives, the roll 9 will still continue to be driven. The other rolls 10, 11 and 12 forming part of the apron are driven from the roll 9 by means of the train of gearing indicated in dotted lines in Fig. 8. This gearing comprises a spur gear 34 keyed to the reduced end 20 of the roll 9, and the spur gears 35, 36, 37, 38, 39 and 40 intermeshing as indicated in Fig. 8, the gears 35, 37 and 39 being idlers supported upon short shaft sections extending through the opposing walls of the end member 14 between which lies the cavity 41 for reception of the gears. The end member 14 is provided with a removable cap 42 held in place by the bolts 43 as indicated in Fig. 8. In this manner, the four rolls comprising the body of the apron are driven from the end roll 9 having the double drive as heretofore described.

The method of releasably supporting the apron so that it may occupy the position indicated in full lines in Fig. 2 or be dropped to the position indicated in dotted lines in such figure will be understood by refernece to Figs. 1, 2 and 3. Extending transversely of the roll housing and carried by suitable brackets 44 is a shaft 45 carrying two crank arms 46 at its ends which are connected by means of the rods 47 with lugs 24 and 25 on the end members of the apron. The shaft 45 also carries loosely mounted upon it a stop arm 48 whose end is adapted to engage the end of the release lever 49 pivoted upon a bracket 50 as indicated in Fig. 3. The stop arm 48 is releasably held in its position of rotary adjustment upon the shaft 45 by means of the arm 51, which is keyed to the shaft 45, and the rod 52. The arm 51 is formed with a slot through which the rod 52 extends, and the outer end of such rod is threaded and carries an adjusting nut 53. By means of this arrangement, the rotary position of the stop arm 48 may be adjusted, which adjustment will vary the angle of the apron 7. When the release lever 49 is swung so as to disengage it from the arm 48, the apron will drop by gravity to the dotted line position indicated in Fig. 2.

In case a large mass of glass accidentally comes through the forming rolls tending to overheat and injure the rolls of the apron and table, or if for any reason, it becomes desirable to separate the forming rolls and run out a considerable quantity of glass which is not to be formed into a sheet, the the apron is dropped permitting the glass to flow down through the opening thus formed so that it strikes the inclined surface 54 of the refractory member 55 carried by the truck, from which point it is directed to the side of the car and into a suitable receptacle which may be provided. In order to protect the lower side of the apron and table rolls from draft during the regular operation, the gate members 56 lined with insulating material and mounted upon the shaft 57 are employed. These gates are operated from the connecting rods 58 secured at their upper ends to the crank arms 46. When the release lever is operated permitting the apron to drop to open position, the gates 56 are swung at the same time to open position.

Equally important as the safety feature of the device is the feature of adjustment made possible by the use of the arms 48 and 51 and the rod 52. The angle of the apron governs the extent of contact between the lower side of the ribbon A and the lower forming roll 4, and this extent of contact may be varied to advantage, depending upon the speed at which the ribbon is being formed, and the temperature of the glass. This angle will vary when the machine is first started up, and will differ from the final operating angle, so that a ready adjustment, such as provided by the nut 53 on the rod 52, is of great advantage.

What I claim is:

1. In combination with apparatus for continuously withdrawing a plastic sheet or ribbon of glass from a tank, including a pair of forming rolls, of a table for receiving the continuously formed sheet below the pass between the rolls, an apron intermediate the forming rolls and table mounted for swinging movement about its end adjacent the table, and means for supporting the apron at various angles of adjustment.

2. In combination with apparatus for continuously withdrawing a plastic sheet or ribbon of glass from a tank, including a pair of forming rolls, of a table for receiving the continuously formed sheet below the pass between the rolls and an apron intermediate the forming rolls and the table mounted for swinging movement about one of its ends, and releasably supported in position so that it may be dropped out of the way to provide a discharge space between the forming rolls and the table.

3. In combination with apparatus for continuously withdrawing a plastic sheet or ribbon of glass from a tank, including a pair of forming rolls, of a table for receiving the continuously formed sheet below the pass between the rolls, an apron consisting of a plurality of rolls intermediate the forming rolls and table mounted for swinging movement about its end adjacent the table, and means for supporting the apron at various angles of adjustment.

4. In combination with apparatus for continuously withdrawing a plastic sheet or ribbon of glass from a tank, including a pair of forming rolls, of a table for receiving the continuously formed sheet below the pass between the rolls and an apron consisting of a plurality of rolls intermediate the forming rolls and table mounted for swinging movement about its end adjacent the table, and releasably supported in position, so that it may be dropped out of the way to provide a discharge space between the forming rolls and table.

5. In combination with apparatus for continuously withdrawing a plastic sheet or ribbon of glass from a tank, including a pair of forming rolls, of a table for receiving the continuously formed sheet below the pass between the rolls, an apron consisting of a plurality of rolls intermediate the forming rolls and table mounted for swinging movement about its end adjacent the table, and means for supporting the apron at various angles of adjustment and also arranged to lower the apron to provide a discharge space between the forming rolls and the table.

6. In combination with apparatus for continuously withdrawing a plastic sheet or ribbon of glass from a tank, including a pair of forming rolls, of a table for receiving the continuously formed sheet below the pass between the rolls, an apron consisting of a plurality of rolls intermediate the forming rolls and table mounted for swinging movement about its end adjacent the table, supporting means for the apron, release means therefor so that the apron may be permitted to swing down and out of the way to provide a discharge opening and adjusting means in connection with the supporting means for varying the angle of the apron.

7. In combination with apparatus for continuously withdrawing a plastic sheet or ribbon of glass from a tank, including a pair of forming rolls, of a table for receiving the continuously formed sheet below the pass between the rolls, an apron consisting of end bearing members, and a plurality of rolls journalled therein, hollow trunnions concentric with the forward roll upon which the apron is pivoted, a driven shaft extending through said trunnions, gearing carried by the apron for driving the rolls from said shaft and means for supporting and swinging the apron about said trunnions.

In testimony whereof, I have hereunto subscribed my name this 18th day of Jan., 1924.

JOHN H. FOX.